United States Patent [19]

Peterson

[11] Patent Number: 4,856,954
[45] Date of Patent: Aug. 15, 1989

[54] METHOD OF THREAD MASKING AND THREAD MASKED PART

[75] Inventor: Francis C. Peterson, Woodbury, Conn.

[73] Assignee: Buell Industries, Inc., Waterbury, Conn.

[21] Appl. No.: 195,970

[22] Filed: May 18, 1988

[51] Int. Cl.$^4$ ............................................. F16B 37/00
[52] U.S. Cl. ........................................ 411/427; 411/378;
 411/903; 134/1; 134/4; 134/38; 427/156;
 427/287; 427/388.5
[58] Field of Search ............... 411/427, 428, 901, 903,
 411/378; 427/156, 287, 388.5; 134/1, 4, 38

[56] References Cited

U.S. PATENT DOCUMENTS

| | | | |
|---|---|---|---|
| 3,416,492 | 12/1968 | Greenleaf | 411/903 X |
| 3,483,056 | 12/1969 | Cheesman et al. | 411/427 X |
| 4,210,567 | 7/1980 | Kösters | 524/290 |
| 4,268,544 | 5/1981 | Wallace | 427/287 X |
| 4,278,713 | 7/1981 | Burba et al. | 427/388.5 X |
| 4,548,967 | 10/1985 | Brown et al. | 134/38 X |
| 4,701,348 | 10/1987 | Neville | 427/385.5 X |
| 4,748,049 | 5/1988 | Charles et al. | 427/156 |

Primary Examiner—Gary L. Smith
Assistant Examiner—Douglas E. Ringel
Attorney, Agent, or Firm—St. Onge Steward Johnston & Reens

[57] ABSTRACT

A method of masking the threaded portion of a threaded fastener part to prevent adhesion of coatings comprising the steps of applying a film of a heat activated foaming polymeric material to the threaded portion of a threaded part prior to exposing the threads to a coating and heating the foaming material subsequent to the application of a coating thereto. The foaming material comprises a plastisol, preferably including a vinyl compound, which most preferably is polyvinyl chloride. The foaming material further comprises a blowing agent, preferably azodicarbonamide.

14 Claims, 1 Drawing Sheet

METHOD OF THREAD MASKING AND THREAD MASKED PART

FIELD OF THE INVENTION

The present invention relates to a method of masking the threads in a threaded part and a thread masked part that will prevent paint and other coatings from adhering to and clogging the threads of such parts.

BACKGROUND OF THE INVENTION

The steps of painting and baking the paint on an automobile body and other manufactured items typically involves applying paint to the entire item, for example, by electrochemical deposition of paint onto the item. As a consequence, screw threads in metal parts of the item will be covered with paint. This coating of paint will clog the screw threads, making the later insertion of bolts or other threaded fasteners more difficult and time consuming than if there were no such paint coating.

The paint clogged threads increase the amount of torque necessary to secure together threaded parts, and prevent such threaded parts from being smoothly secured together. The paint clogged threads may also cause problems of cross-threading of a nut and bolt, leading to stripped threads and a consequent loss of the time and money needed to replace the threaded parts. Replacing a threaded part may also cause problems if the corrosion resistant coatings applied to products such as automobile bodies is compromised.

Two primary techniques have been used in the past to overcome these problems of paint clogging. One technique has been to insert a plastic sleeve into nuts and other threaded apertures. However, this is a tedious and time consuming procedure, as it requires mounting such sleeves into numerous threaded apertures in the manufactures item. Another technique is to apply a coating of polytetrafluoroethylene (PTFE) to the threads needing paint protection. However, this procedure has been found to be costly because of the cost of the PTFE material.

SUMMARY OF THE INVENTION

The threads of a threaded part are masked with a film of a heat activated foaming polymeric material. The film of foaming material is a plastisol, preferably including a vinyl compound, most preferably a polyvinyl chloride, although other polymers may be employed in a plastisol having the necessary foaming qualities. A blowing agent is provided to cause foaming upon heating. Preferably, the blowing agent is azodicarbonamide. The film is applied to the threads of the threaded part prior to the application of paint or other coatings. After the paint coating has been applied, the foaming material is heated, causing the film of foaming material to bubble, breaking up the paint coating and detaching the foaming material from the threads.

DETAILED DESCRIPTION OF THE INVENTION

Figure 1:
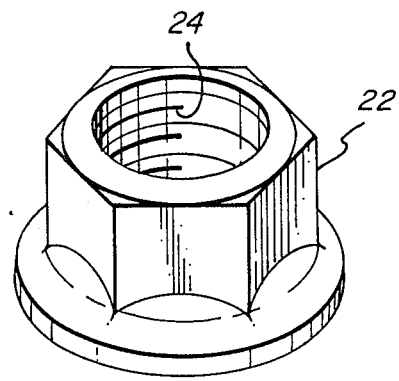
FIG. 1 is a perspective view of a nut prior to application of a film of foaming material.
Figure 2:
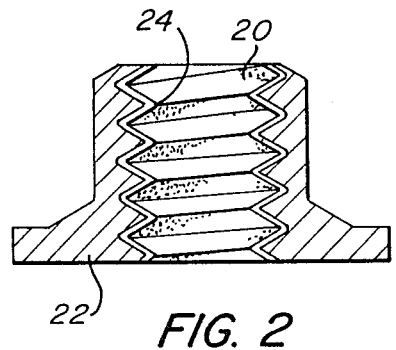
FIG. 2 is a cross-sectional view of a nut showing a film of the foaming material applied to the threads thereof.
Figure 3:
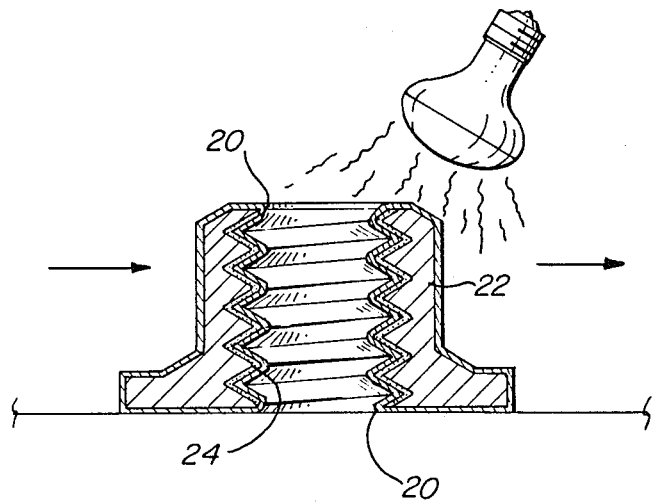
FIG. 3 is a cross-sectional view of a nut of FIG. 2 showing the film of the foaming material being foamed by application of heat.

A heat activated foaming polymeric material 20 is applied to the threads of a threaded fastener part, such as the nut 22 shown in FIGS. 1 and 2, to mask threads 24 so that paint and other coatings applied to the part do not adhere to the threads and clog them. The threaded fastener part may also be an aperture in a manufactured part in which threads have been tapped, or may be a threaded screw. After the application of paint or other coatings, the foaming material 20 is heated, for example as shown in FIG. 3, until the material foams, so that the paint coating is broken up. The foaming material and paint coating are easily removed from the threads 24 of the fastener part, for example, by the scraping action of a screw 26 when the nut 24 and screw 26 are screwed together.

The heat activated foaming material is preferaby a plastisol comprising a vinyl compound, preferably polyvinyl chloride. The foaming material further comprises a blowing agent, preferably azodicarbonamide.

The method of thread masking and thread masked part of the present invention are further disclosed by the following example:

EXAMPLE

A heat activated foaming polymeric material 20 comprising by weight:

| | |
|---|---|
| Polyvinyl chloride resins | 45.00% |
| Silicate filler | 11.00% |
| Pigment | .50% |
| Zinc octoate | 2.00% |
| Azodicarbonamide | 1.50% |
| Phtalate plasticizers | 40.00% | is applied to the threads 24 of threaded nut 22 shown in FIG. 1 by a spray so that the threads 24 are covered with a film of the foaming material 20. The nut 22 is then assembled into a automotive body and located to receive the screws of a door mounting which will be assembled into the automotive body after the body is painted. The automotive body is painted by electrochemical deposition of paint on the body dipped in a paint bath. The automotive body and the thread masked nut 22 are then baked in an oven at about 2400 to about 3700 degrees Farenheit to bake the paint. During the paint baking step the azodicarbonamide degrades and generates a gas which causes the material 20 to foam, breaking up the paint coating on the nut threads 24, as shown in FIG. 3.

Figure 4:
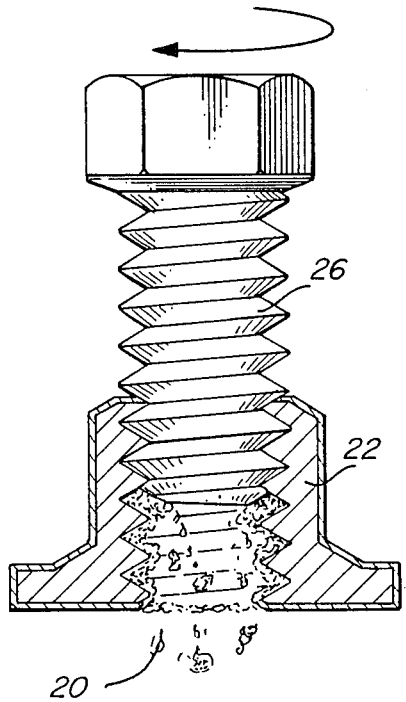
FIG. 4 is a cross-sectional view of the foamed material pushed out of a nut by the action of a threaded screw fitted into the nut of FIG. 3.

A threaded screw 26 is then inserted into the thread masked nut 22 as part of the mounting of the automobile door to the automotive body. As shown in FIG. 4, the screw 26 pushes the foamed material 20 and paint coating out of the nut 22. The securing of the screw 26 into thread masked nut 22 requires the same torque as would be required to secure the same screw 26 and nut 22 together where no paint had been applied thereto.

The use of the thread masked part provides an economy unavailable in prior art approaches to the problem of paint clogged threads in a fastener part. Unlike the use of a plastic insert to protect the threads, the present invention requires no additional step of removing the insert before securing together threaded parts. Unlike the use of expensive PTFE coatings to minimize paint adhesion to the threads, the present invention uses a much more economical vinyl compound and blowing agent.

Therefore, the present invention represents a great improvement over prior art treatments of the problem of paint clogged threads.

I claim:

1. A method of masking the threaded portion of a threaded fastener part to prevent adhesion of coatings, comprising the steps of:

applying a film of a heat activated foaming polymeric material, having the quality of being easily detachable from a substrate after foaming, to the threaded portion of a threaded part prior to applying a coating to said part;

heating said foaming material, subsequent to the application of a coating to said threaded fastener part, sufficiently to cause said foaming material to foam and become easily detachable from the threaded portion of the threaded fastener part such that said foamed material may be detached from the threaded portion of the threaded fastener part by threading together said threaded fastener part with a matching threaded part.

2. A method of masking in accordance with claim 1 wherein said foaming material comprises a plastisol.

3. A method of masking in accordance with claim 2 wherein said foaming material comprises a vinyl compound.

4. A method of masking in accordance with claim 3 wherein said foaming material comprises a polyvinyl chloride.

5. A method of masking in accordance with claim 2 wherein said foaming material further comprises a blowing agent.

6. A method of masking in accordance with claim 5 wherein said blowing agent comprises azodicarbonamide.

7. A threaded masked threaded fastener part, comprising:

a threaded fastener part; and a coating of a heat activated foaming polymeric material applied to the threads of said part, said foaming material having sufficient foaming ability such that it will foam and be detached from the threads of said fastener part after foaming by the fitting together of said fastener part with a matching fastener part.

8. A thread masked fastener part in accordance with claim 7 wherein said foaming material comprises a plastisol.

9. A thread masked fastener part in accordance with claim 8 wherein said foaming material comprises a vinyl compound.

10. A thread masked fastener part in accordance with claim 9 wherein said foaming material comprises polyvinyl chloride.

11. A thread masked fastener part in accordance with claim 8 wherein said foaming material further comprises a blowing agent.

12. A thread masked fastener part in accordance with claim 11 wherein said blowing agent comprises azodicarbonamide.

13. A thread masked nut, comprising:

a nut having threading therein; and a coating of a heat activated foaming polymeric material applied to the threads of said nut, said foaming material having sufficient foaming ability such foam and detach from the thread of said nut after that it will foaming by the fitting together of said nut with a matching threaded screw.

14. A thread masked nut in accordance with claim 13 wherein said foaming material comprises a polyvinyl chloride plastisol and a blowing agent.

* * * * *